United States Patent [19]
Willett

[11] 3,760,569
[45] Sept. 25, 1973

[54] SUGAR CANE TOPPER FOR V-CUTTER HARVESTER

[75] Inventor: Harold A. Willett, Thibodaux, La.

[73] Assignee: Cane Machinery & Engineering Company, Inc., Thibodaux, La.

[22] Filed: May 8, 1972

[21] Appl. No.: 251,142

[52] U.S. Cl. .................................. 56/10.7, 56/63
[51] Int. Cl. ........................................... A01d 45/10
[58] Field of Search ............... 56/53, 63, 13.5–13.9, 56/14.3, 235, 10.7

[56] References Cited
UNITED STATES PATENTS

| | | | |
|---|---|---|---|
| 3,398,515 | 8/1968 | Ash | 56/63 |
| 3,587,214 | 6/1971 | Willett | 56/10.7 |
| 3,214,895 | 11/1965 | Leydig et al. | 56/235 |
| 3,599,404 | 8/1971 | Fernandez et al. | 56/14.3 |
| 3,025,653 | 3/1962 | Ackermann | 56/63 |

*Primary Examiner*—Antonio F. Guida
*Attorney*—Wilkinson et al.

[57] ABSTRACT

The present disclosure is directed to a cane topping device for simultaneously topping two rows of cane being cut by a V-cutter harvester wherein overlapping cutters are raised and lowered to compensate for varying cane stalk height and the angle of attack of the cutting blades of the topper may be varied.

8 Claims, 5 Drawing Figures

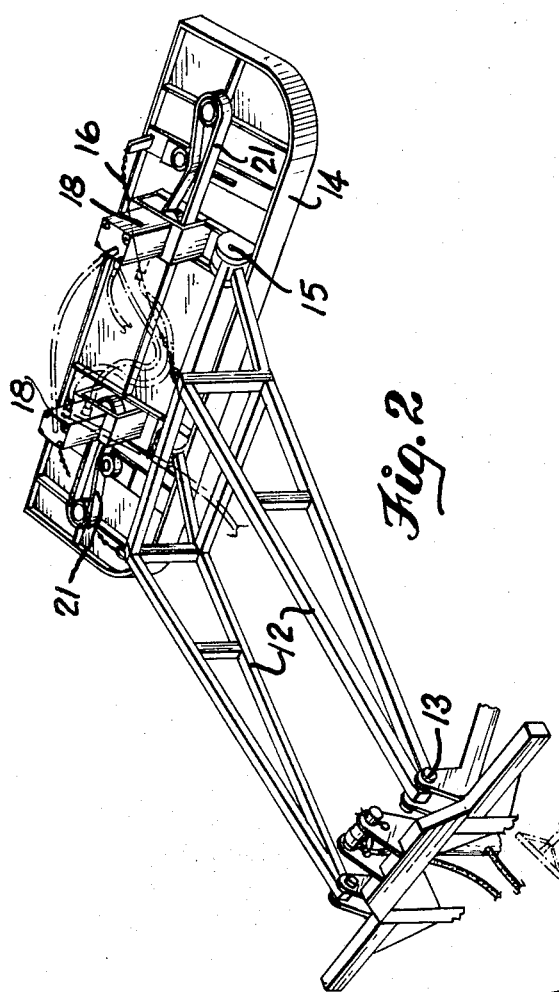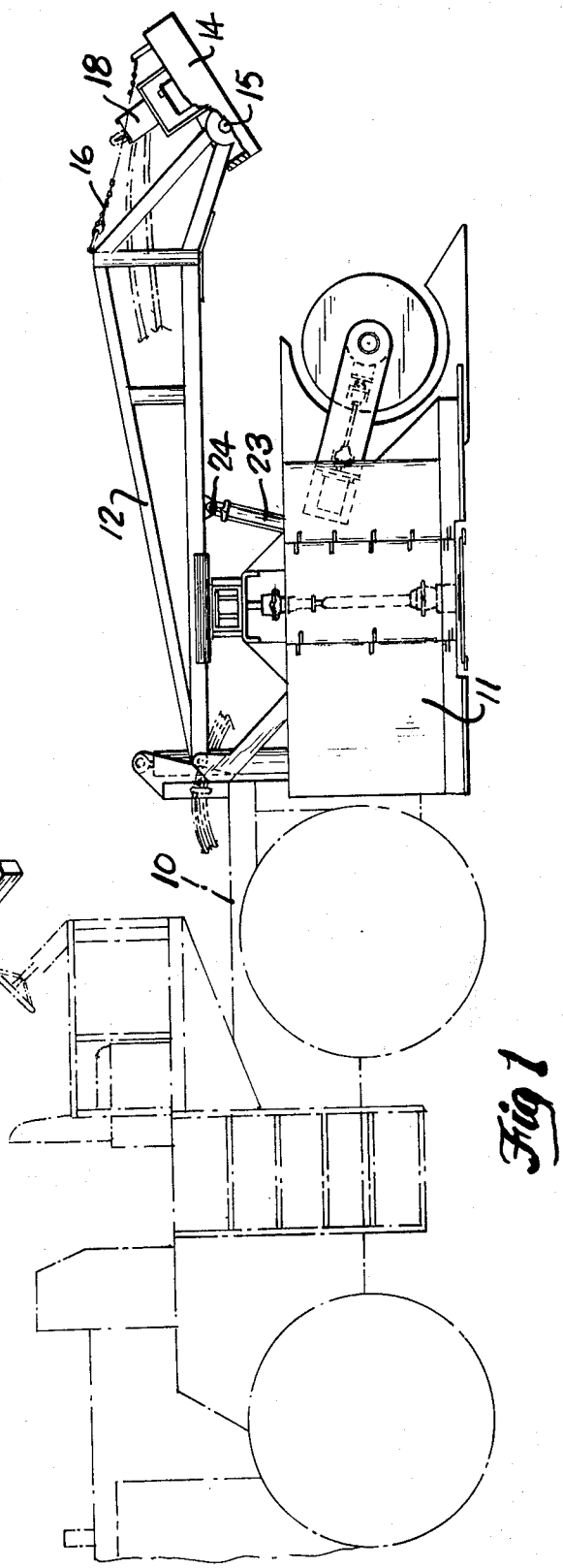

SUGAR CANE TOPPER FOR V-CUTTER HARVESTER

An object of the present invention is to provide a cane topper for a V-cutter harvester for simultaneously topping two rows of cane being harvestered by a V-cutter which topper is elevatable and its angle of attack variable to compensate for difference in height and maturity of the cane stalks.

Another object of the present invention is the provision of two pairs of overlapping cutter blades, one of each pair of which are driven by a hydraulic motor and the other blade of each pair of which is belt driven by the shaft of the blade driven by the hydraulic motor.

With the foregoing and other objects in view the invention will be more fully described hereinafter and more particularly pointed out in the appended claims.

In the drawings in which like parts are denoted by reference characters throughout the several views:

FIG. 1 is a side elevational view of the sugar cane topper for a V-cutter harvester in accordance with the present invention.

FIG. 2 is a perspective view of the cane topper of FIG. 1.

Figure 3:
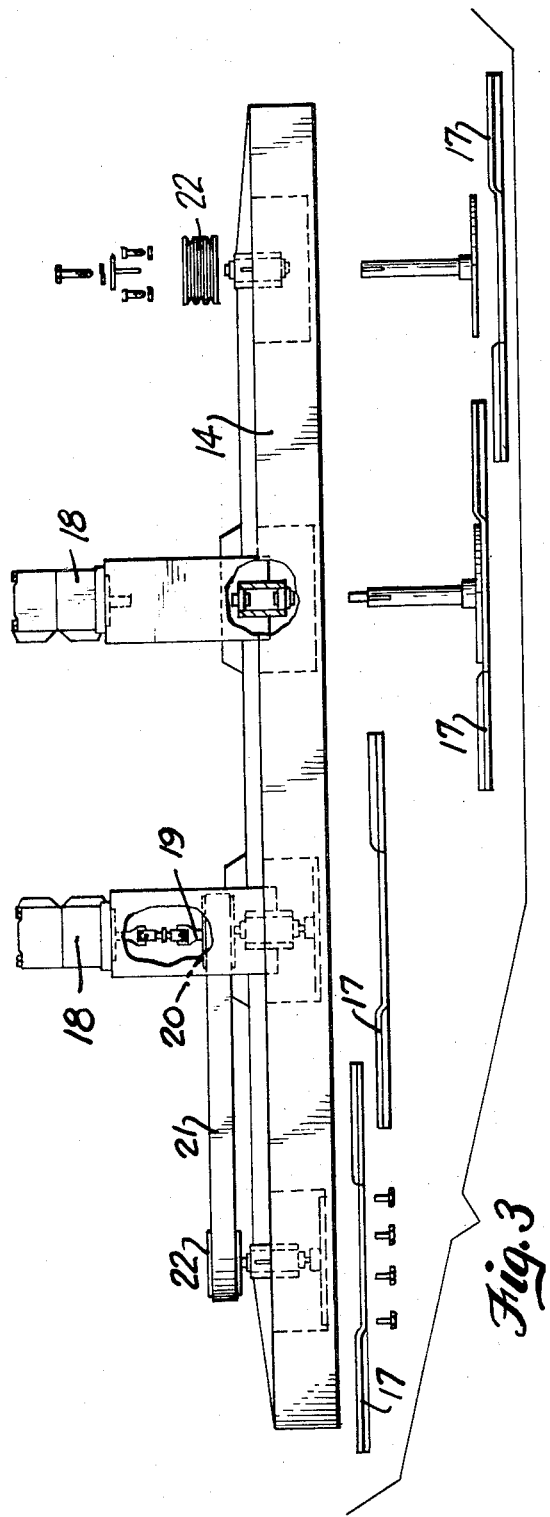
FIG. 3 is a front elevational view with parts broken away and parts shown disassembled of the topper of the present invention.

Referring now to FIGS. 1 and 2, 10 designates a mobile harvester frame having a V-type sugar cane harvester 11 on its front end. This is the type harvester shown and described in my prior U. S. Pat. No. 3,587,214 granted June 28, 1971. The primary raising and lowering frame 12 is pivoted at one end to the mobile frame at 13 and supports the generally rectangular secondary or cutter frame 14 by pivotal connections 15 which are proximate one of the long sides of the topping cutter rectangular frame. Adjustable flexible connections 16 in the form of either chains or cables permit rocking of the plane of cut of the topping cutters about the pivots 15 to vary the angle of attack depending upon the specie of cane or other agricultural variations.

Figure 4:
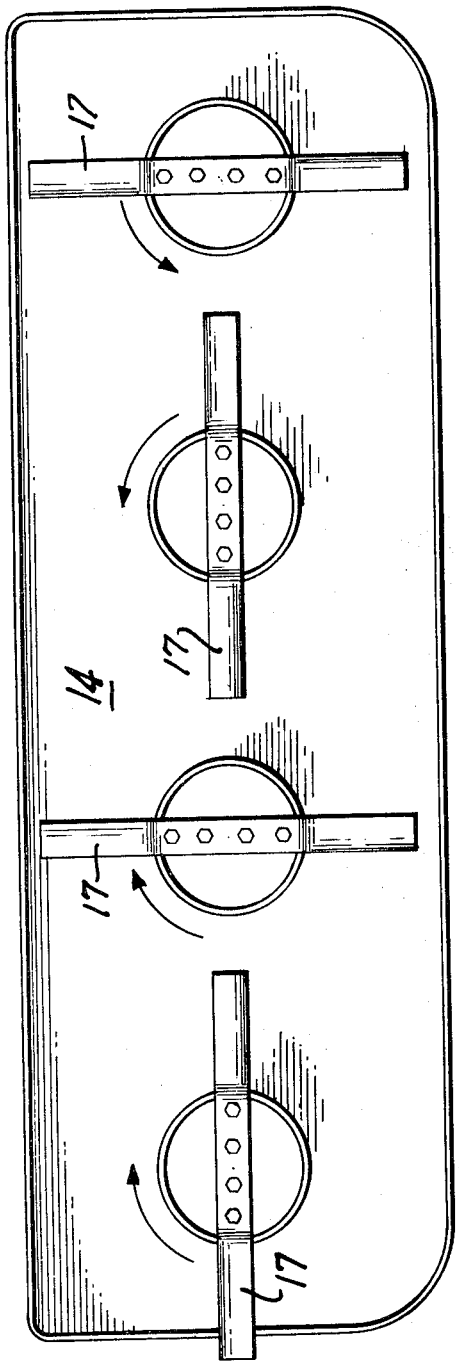
FIG. 4 is a bottom view of the cane topper of FIG. 3 in assembled condition.

Referring now to FIGS. 3 and 4, the cutter frame 14 has two pairs of substantially flat cutting blades 17, one of each pair being driven by hydraulic motors 18, through shafts 19 which drive pulleys 20 which through belts 21 drive pulleys 22 which compels rotation of the other cutter blade 17 of each of the pairs. The hydraulic motors 18 are driven from the mobile frames hydraulic plant under control of a valve at the operators console (not shown).

The cutter frame 14 is connected to the raising and lowering frame by the pivots 15 which are off the center of the frame so that the weight of the hydraulic motors 18 and the drives and blades will cause the unit to rotate about the pivot 15 and be restrained at the desired angle of attack by the flexible connections 16.

When it is desired to raise or lower the primary frame 12 and its connected secondary or cutter frame 14, this is accomplished by a cylinder and ram assembly 23, one element of which is connected to the primary frame 12 at 24 and the other end of which is connected to the mobile frame (not shown).

Figure 5:
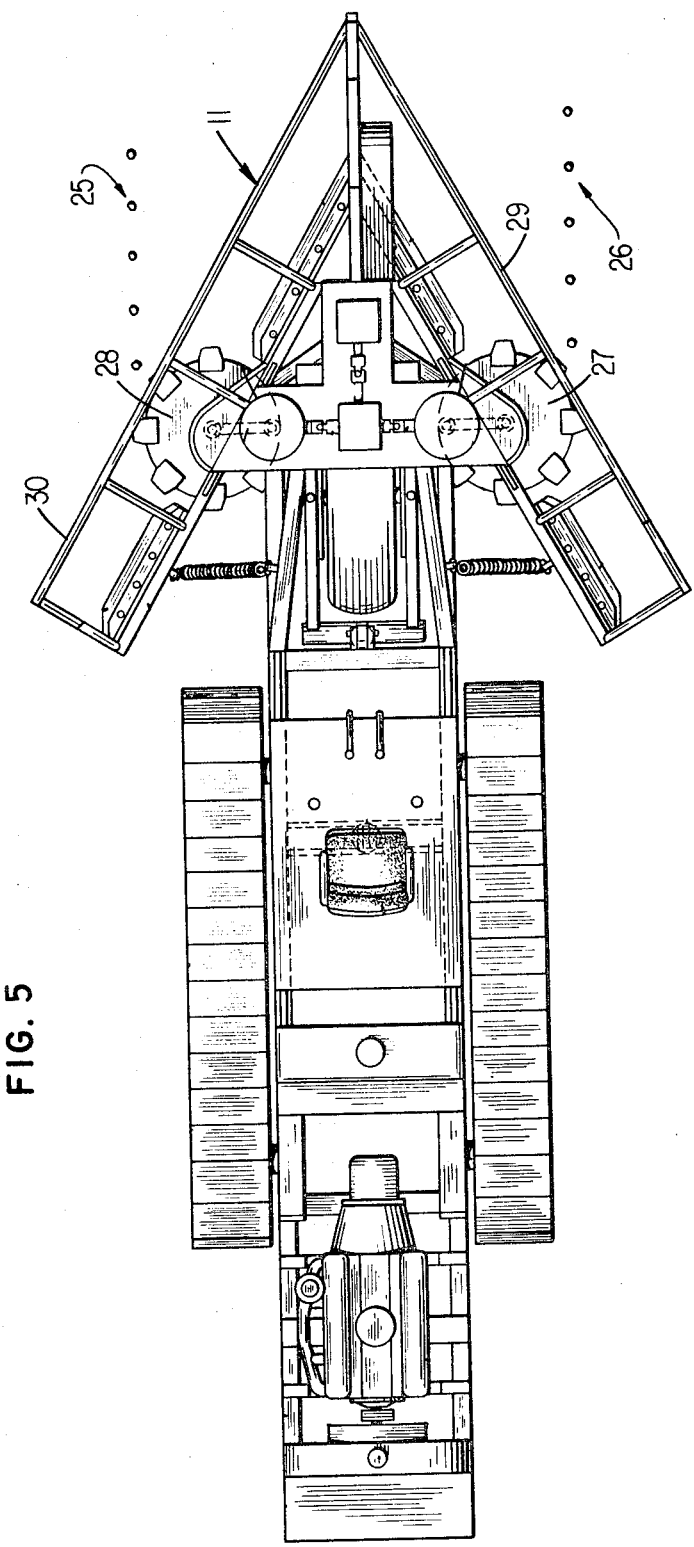
FIG. 5 is a top plan view of a V-cutter harvester for cutting two rows of cane and being mounted on a crawler tractor.

As best seen in FIGS. 4 and 5 the mid point between each pair of cutter blades 17 lies over the centerline of two adjacent standing rows of sugar cane 25, 26 which is severed by the rotary cutters 27, 28 in each leg 29, 30 of the V-cutter harvester. The topping of the cane takes place before the cane stalks are severed from the earth.

What I claim is

1. For use with a V-cutter sugar cane harvester having a mobile frame and hydraulic power plant, a sugar cane topper comprising a primary frame adapted to be pivoted to the forward portion of the harvester mobile frame for up and down movement, a secondary frame pivoted to the primary frame for vertical rocking movement about a horizontal axis, two pair of cane top cutting means mounted on said secondary frame for topping two rows of sugar cane simultaneously, means connected between said primary frame and secondary frame for varying the angular relation of the cane top cutting means to the cane, and primary frame elevating and lowering means connected between said primary frame and its pivoted connection to the mobile frame and to said mobile frame to adjust the height of cane topping cut.

2. A sugar cane topper as claimed in claim 1 wherein said secondary frame is substantially rectangular with its major axis at a right angle to said primary frame and wherein said pivotal connection to said primary frame is proximate one of the long sides of the rectangular frame.

3. A sugar cane topper as claimed in claim 1 wherein said two pair of cane top cutting means are pairs of overlapping flat blades, one of each pair of which is driven by a hydraulic motor and the other blade of each pair being driven by a belt drive which receives its power from the hydraulic motor.

4. A sugar cane topper as claimed in claim 1 wherein said means for varying the angle of attack of said cane top cutting means is an adjustable flexible connection between the free long side of the secondary rectangular frame and a high point on said primary frame.

5. A sugar cane topper as claimed in claim 1 wherein said primary frame elevating and lowering means is a hydraulic cylinder and ram connected between said primary frame and said mobile frame and being in circuit with the hydraulic system of the harvester.

6. For use with a V-cutter type sugar cane harvester having a mobile frame with a V-cutter mounted on its leading end with the apex of the V-structure directed forwardly and cane earth severing means at the bottom of each leg of the V-structure to cut two rows of cane simultaneously; a sugar cane topper comprising a cane topper cutting frame, two pairs of rotary cutters mounted on said frame to cut parallel to said frame and beneath same so that two rows of cane are topped simultaneously, an elevating frame adapted to be pivotally connected at one end to the forward end of the harvester mobile frame and having the cane topper cutting frame connected to its free end, elevating and lowering means for said secondary frame one end of which is connected to said secondary frame forwardly of its pivotal connection to the mobile frame and the other end of which is connected to the mobile frame for raising and lowering the primary and secondary frame to regulate the elevation of cut of said rotary cutters, and means connected between said primary and secondary frames for varying the angular relation of the cane top cutting means to the cane.

7. A sugar cane topper as claimed in claim 6 wherein said pairs of rotary cutters are hydraulic motor driven pairs of overlapping cutter blades, one of each of which is driven by the hydraulic motor and the other of each pair is belt driven by the first hydraulically driven cutter.

8. A sugar cane topper as claimed in claim 1 further comprising an adjustable flexible connection between said cane topper cutting frame and said elevating frame for varying the angle of attack of said cutter blades.

* * * * *